Feb. 7, 1939. P. SHAW 2,146,359
BLOCK FOR ROAD SURFACE MARKING
Filed Sept. 6, 1938 2 Sheets-Sheet 1

INVENTOR
Percy Shaw
By Eugene C. Stevens
ATTY.

Feb. 7, 1939.   P. SHAW   2,146,359
BLOCK FOR ROAD SURFACE MARKING
Filed Sept. 6, 1938   2 Sheets-Sheet 2

INVENTOR
Percy Shaw
By Eugene E. Stevens
ATTY

Patented Feb. 7, 1939

2,146,359

UNITED STATES PATENT OFFICE 2,146,359

BLOCK FOR ROAD SURFACE MARKING

Percy Shaw, Halifax, England

Application September 6, 1938, Serial No. 228,647
In Great Britain July 29, 1937

1 Claim. (Cl. 88—79)

This invention relates to blocks for road surface markings in which a filling of resilient material such as white or brightly coloured rubber is partially supported within a metal holder so that the filling will yield by displacement and deformation or by either when travelled over by a vehicle wheel or stepped upon by a pedestrian and sink to the level of the road surface or thereabouts, reflectors which are easily visible during the daytime and lit up at night, or during fog by the lights of passing vehicles being embedded in the walls of the rubber filling and subjected to a wiping action by adjacent portions of the rubber filling during the displacement and return movement of the latter whereby the reflectors are automatically cleaned by the movements to which the filling is subjected during its ordinary use.

In the accompanying drawings:—

Figure 1:
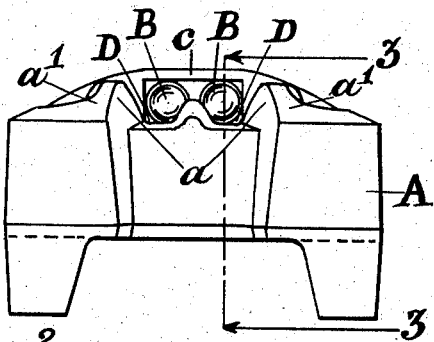
Fig. 1 is a front view and Fig. 2 an end view of a block for road surface marking constructed in accordance with this invention.
Figure 2:
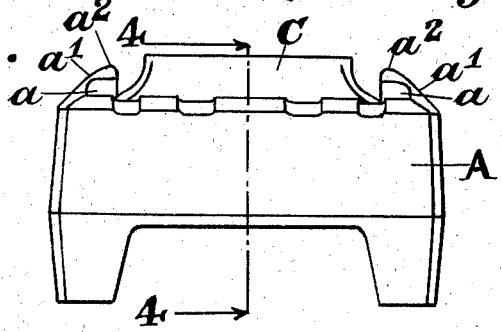
Figure 3:
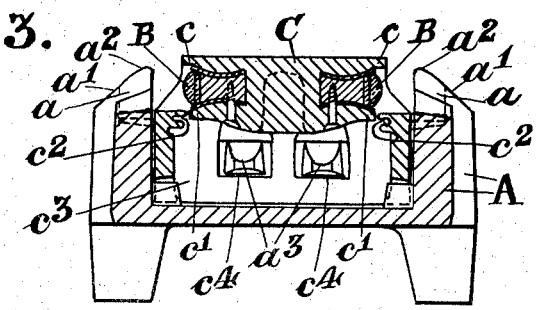
Fig. 3 is a section taken on line 3—3 of Fig. 1.
Figure 4:
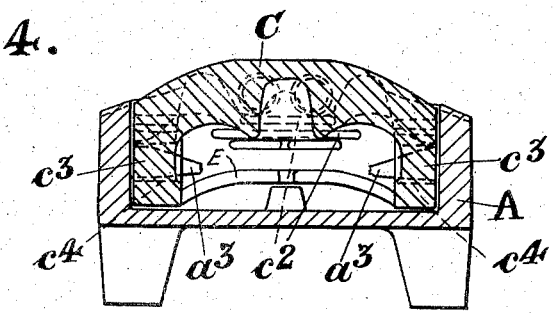
Fig. 4 is a section taken on line 4—4 of Fig. 2.
Figure 5:
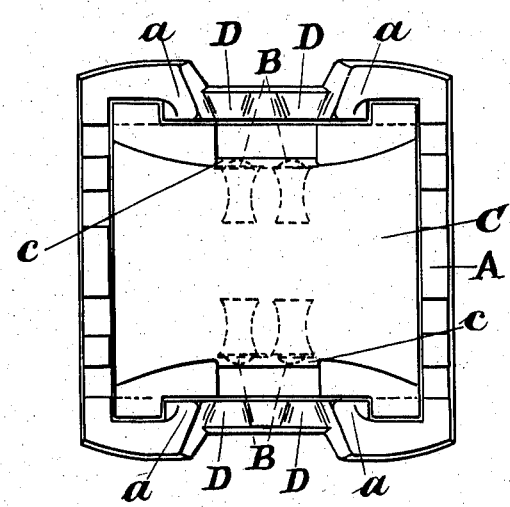
Fig. 5 is a plan of the block.
Figure 6:
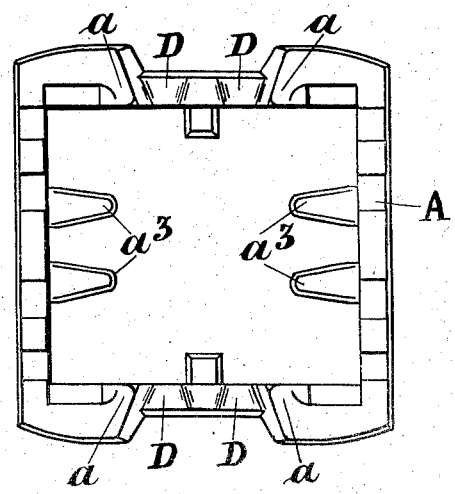
Fig. 6 is a similar view with the rubber filling removed.

According to this invention the side walls $a$ of the metal holder A which occupy a position in front of the reflectors B are raised sufficiently to constitute a guard for the reflectors and for the portion of the rubber filling C which carries them. This guard receives the side thrust of the vehicle wheel that would otherwise be exerted on the rubber filling C but does not prevent the latter from being pressed downwardly by the wheel as the latter is passing over it. Gaps D are left in the raised portion for the reflectors to show through and the top of the raised portion is inclined or bevelled at $a^1$ as shown in Figs. 2 and 3 to such an angle that when struck by a metal horse shoe, it will deflect the latter upwardly and cause it to miss the reflectors, or portion of the rubber that carries them. The corners of the inclined or bevelled top are advantageously rounded at $a^2$ to avoid damage to rubber tires. The top of the rubber filling above the reflectors is formed with an overhanging ledge $c$ Fig. 3 which acts as a cowl to prevent unwanted rays from acting detrimentally on the reflectors, the same effect can be obtained by mounting the reflectors in a recess the wall of which is set back from the wall of the rubber filling C as shown in Fig. 3. The rubber filling is made in the form of an inverted box, the sides of which are cut or separated from the top below the reflectors at $c^1$ and have their inner surfaces formed with one or more projecting lips $c^2$ or a succession of resilient wiping surfaces which wipe the reflectors B as the latter are pressed downwardly and against the wiping surfaces by the action of a vehicle wheel as it passes over the rubber filling. The end walls $c^3$ of the latter are formed with holes $c^4$ for the passage of internal projections $a^3$ in the metal holder A which retain the the india rubber filling in position and in order to prevent the latter from being removed after it has been placed in position a loose block E may be inserted in the rubber filling during the time that the latter is being levered into position, the construction being such that when this operation has been completed the loose block falls on to the bottom of the holder as shown in Fig. 4 and prevents the end walls $c^3$ of the filling from being moved in a direction to withdraw them from engagement with the internal projections $a^3$ in the holder. In the event of water getting into the metal holder A such water is pumped out again by the action of the rubber filling when the latter is depressed by a vehicle wheel and such water in its passage through the cuts $c^1$ exerts a washing action on the reflectors.

A block and holder constructed in the manner described can be used for a curb marking by being let into a curb in a horizontal or more or less upright position, the main difference being that for this application the block and holder may be made somewhat smaller than the one used for road surface marking.

What I claim as my invention and desire to secure by Letters Patent in the United States is:—

A block for use on roads and curbs comprising a metal holder made in the form of an open box adapted to be let into and fixed in the road or curb, a rubber filling made in the form of an inverted box which fits in the metal holder and is supported therein at two ends, the upper surface of the rubber filling rising towards the centre above the level of the road or curb and having a recess formed in each of two opposite walls, a reflector fixed in the rubber filling in the said recess the portion of the rubber which carries the reflector being separated from the adjacent side wall, a wiping surface on said side wall to wipe the reflector when the rubber filling is depressed, inclined projecting guards on two opposite side walls of the metal holder to protect the raised portion of the rubber filling from side thrust, a space between said guards to render the reflectors visible, and internal projections on the holder walls to enter apertures formed in the corresponding walls of the rubber filling.

PERCY SHAW.